(12) United States Patent
Saitoh et al.

(10) Patent No.: US 7,441,424 B2
(45) Date of Patent: Oct. 28, 2008

(54) CLAMP-ON HOLDER

(75) Inventors: Masatoshi Saitoh, Saitama (JP); Takako Negishi, Saitama (JP)

(73) Assignee: Washin Optical Co., Ltd., Tokyo (JP)

( * ) Notice: Subject to any disclaimer, the term of this patent is extended or adjusted under 35 U.S.C. 154(b) by 0 days.

(21) Appl. No.: 11/799,735

(22) Filed: May 2, 2007

(65) Prior Publication Data

US 2007/0283729 A1  Dec. 13, 2007

(30) Foreign Application Priority Data

May 19, 2006  (JP)  ............................. 2006-165312

(51) Int. Cl.
*E05B 73/00* (2006.01)
(52) U.S. Cl. .............................. 70/19; 24/303; 24/532; 70/57.1; 70/63; 70/276; 292/251.5; 340/572.9
(58) Field of Classification Search .................... 70/57, 70/57.1, 19, 63, 276, 413; 24/303, 532, 542; 292/251.5; 340/572.8, 572.9; 248/551–553, 248/206.5, 309.4, 316.1, 316.5; 63/29.2, 63/900
See application file for complete search history.

(56) References Cited

U.S. PATENT DOCUMENTS

| | | | | |
|---|---|---|---|---|
| 478,245 A | * | 7/1892 | Smith ............................. | 70/276 |
| 1,230,740 A | * | 6/1917 | McCracken .................. | 292/149 |
| 2,063,924 A | * | 12/1936 | Hanko ..................... | 248/229.23 |
| 2,219,186 A | * | 10/1940 | Hornfeck ..................... | 292/144 |
| 2,475,226 A | * | 7/1949 | Ellis .............................. | 24/303 |
| 2,673,111 A | | 3/1954 | Teetor | |
| 2,719,050 A | * | 9/1955 | Teetor ...................... | 292/251.5 |
| 3,744,833 A | * | 7/1973 | Berducone ................ | 292/251.5 |
| 3,942,829 A | | 3/1976 | Humble et al. | |
| 4,622,726 A | * | 11/1986 | Nakamura ................... | 24/574.1 |
| 4,881,386 A | * | 11/1989 | Glines ............................ | 70/19 |
| 5,035,451 A | | 7/1991 | Brady | |
| 5,409,275 A | * | 4/1995 | Yoshida et al. ............ | 292/251.5 |
| 5,437,172 A | | 8/1995 | Lamy et al. | |

(Continued)

FOREIGN PATENT DOCUMENTS

EP           0 615 041           9/1994

(Continued)

*Primary Examiner*—Lloyd A Gall
(74) *Attorney, Agent, or Firm*—Carrier, Blackman & Associates, P.C.; Joseph P. Carrier; William D. Blackman

(57) ABSTRACT

A security tag holder is releasably clamped onto a garment. The holder includes first and second members coupled for relative pivotal movement about a pivot pin. The first member includes first clamping and locking regions at opposite sides of the pin, respectively. The second member includes second clamping and locking regions at opposite sides of the pin. The first locking region has a recess and a fixed magnet. The second locking region has a bore and a movable magnet movable between an unlocking position wherein the movable magnet is received in the bore and a locking position wherein the movable magnet is partly inserted into the recess and attracted to the fixed magnet. When the first and second members are urged against each other to clamp the garment, the movable magnet is moved from its unlocking to locking position to lock the first and second members against relative pivotal movement.

20 Claims, 6 Drawing Sheets

U.S. PATENT DOCUMENTS

| | | | |
|---|---|---|---|
| 5,485,733 A * | 1/1996 | Hoffman | 70/276 |
| 5,711,556 A | 1/1998 | Masters | |
| 6,048,004 A | 4/2000 | Kaufman et al. | |
| 6,276,033 B1 | 8/2001 | Johnson et al. | |
| 6,374,647 B1 | 4/2002 | Holmgren | |
| 6,659,516 B2 * | 12/2003 | Wang et al. | 292/251.5 |
| 6,929,291 B2 * | 8/2005 | Chen | 292/251.5 |
| 6,981,391 B2 * | 1/2006 | Suzuki | 63/3.1 |
| 7,131,616 B2 * | 11/2006 | Livingstone | 248/304 |
| 7,152,282 B2 * | 12/2006 | Costa | 24/303 |
| 7,243,402 B2 * | 7/2007 | Andersen et al. | 24/532 |
| 2005/0097711 A1 * | 5/2005 | Halstead | 24/303 |
| 2005/0198788 A1 * | 9/2005 | Costa | 24/303 |
| 2005/0283953 A1 * | 12/2005 | Jeffrey | 24/303 |
| 2006/0049645 A1 * | 3/2006 | Drumm | 292/251.5 |

FOREIGN PATENT DOCUMENTS

| | | |
|---|---|---|
| EP | 1355027 | 10/2003 |
| JP | 2002-038802 A | 2/2002 |
| WO | WO 99/36653 | 7/1999 |

* cited by examiner

F I G. 1 1
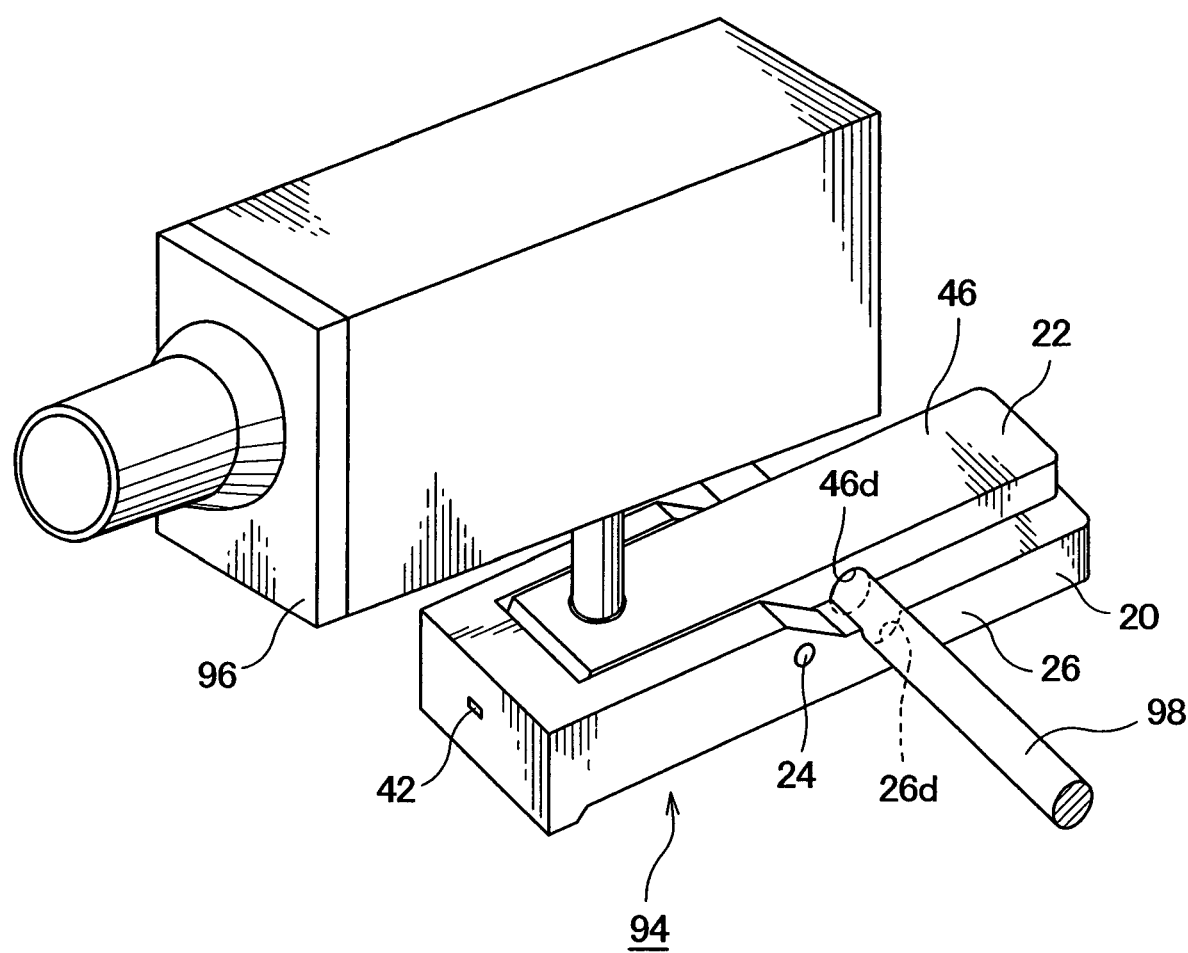

CLAMP-ON HOLDER

BACKGROUND OF THE INVENTION

The present invention generally relates to multi-purpose clamp-on holders and more specifically, to a reusable security tag holder releasably clamped onto merchandise items such as a garment and configured to hold a security tag.

The theft of merchandise items from retail stores is a rapidly increasing problem. Merchandise protection is thus of growing concern to the retailers.

A wide variety of solutions to the theft problem have been developed. For example, U.S. Pat. No. 3,942,829 discloses a reusable security tag holder secured to a garment to be maintained under surveillance. The security tag holder includes a plastic housing within which a clutch lock is contained. A lever has one end hingedly connected to one end of the housing, and a pin is secured to the other, free end of the lever. The free end of the lever is folded over the other end of the housing to grasp the garment. At that time, the pin is passed through the garment and forcibly inserted into the clutch lock to lock the lever to the housing. The pin has a plurality of axially spaced annular grooves with which the clutch lock is latchingly engaged. To release the pin from the clutch lock, a specialized unlatching tool is used to deform the clutch lock to spread its jaws. There exist several drawbacks with the existing security tag holder. As a relatively strong force is required to force the pin into the clutch lock, it is not easy for authorized store personnel, particularly a female clerk, to operate the existing security tag holder. Also, repeated deformation of the clutch lock through the housing may shorten the service life of the existing security tag holder.

It is, therefore, an object of the present invention to provide a clamp-on holder which is easy to operate and can enjoy a long service life.

It is another object of the present invention to provide a clamp-on holder which is readily attachable to and detachable from an article without applying pressure to deform the clamp-on holder.

SUMMARY OF THE INVENTION

According to the present invention, there is provided a clamp-on holder including a first member and a second member coupled to the first member for relative pivotal movement about a common pivot pin. The first member includes a first clamping region at one side of the pivot pin and a first locking region at the other side of the pivot pin. Correspondingly, the second member includes a second clamping region at one side of the pivot pin and a second locking region at the other side of the pivot pin. The first locking region includes a recess and a fixed magnetic element. The second locking region includes a movable magnetic element and a bore dimensioned to accommodate the movable magnetic element. The movable magnetic element is movable between an unlocking position wherein the movable magnetic element is received in the bore and a locking position wherein the movable magnetic element is partly extracted from the bore, and the partly extracted portion of the movable magnetic element is inserted into the recess and magnetically attracted to the fixed magnetic element. The first and second members are relatively pivotable between an open position wherein the first and second clamping regions are separated from one another and a closed position wherein the first and second clamping regions are urged against one another and adapted to clamp an external object such as a garment therebetween. The movable magnetic element is moved from its unlocking to locking position to automatically lock the first and second members against relative pivotal movement when the first and second members are pivotably moved from their open to closed position. The clamp-on holder of the present invention is easy to operate since clamping and locking between the first and second members require a smaller amount of force than the existing security tag holder. Also, locking between the first and second members does not involve deformation of any part of the clamp-on holder. This avoids damages to the clamp-on holder and extends its service life.

The first clamping region has a mating surface and an opposite non-mating surface. Correspondingly, the second clamping region has a mating surface and an opposite non-mating surface. At least one of the mating surface of the first clamping region and the mating surface of the second clamping region includes slip resistant means for preventing removal of the external object from between the first and second clamping regions. In one embodiment, the slip resistant means includes clamp pads secured on the mating surface of the first clamping region and the mating surface of the second clamping region, respectively. The clamp pads may have a plurality of protrusions thereon. In another embodiment, the clamp pads extend around the first clamping region and the second clamping region, respectively. Alternatively, the slip resistant means may include serrated surfaces formed on the mating surface of the first clamping region and the mating surface of the second clamping region, respectively. Optionally, one of the first clamping region and the second clamping region may include a pin, and the other clamping region may include a hole positioned and shaped to receive the pin when the first and second members are moved to their closed position.

In one embodiment, the first locking region includes a key hole for providing access to the interior of the recess. A key is insertable into the key hole and is configured to move the movable magnetic element from its locking to unlocking position. This arrangement allows authorized store personnel to release the clamp-on holder from the external object without applying pressure to deform any part of the clamp-on holder.

One of the first and second members may hold a security tag which is detectable when the clamp-on holder is moved through a security gate. In another example, one of the first and second members may include a threaded hole. An appliance such as a lamp and a security camera may have a threaded end which is threaded into the threaded hole so as to secure such an appliance to the clamp-on holder.

BRIEF DESCRIPTION OF THE DRAWINGS

The present invention may be best understood by reference to the following description when taken in conjunction with the accompanying drawings in which:

FIG. 11 is a perspective view of a security camera holder made according to a further embodiment of the present invention and designed to hold a security camera.

DETAILED DESCRIPTION OF THE INVENTION

Figure 1:
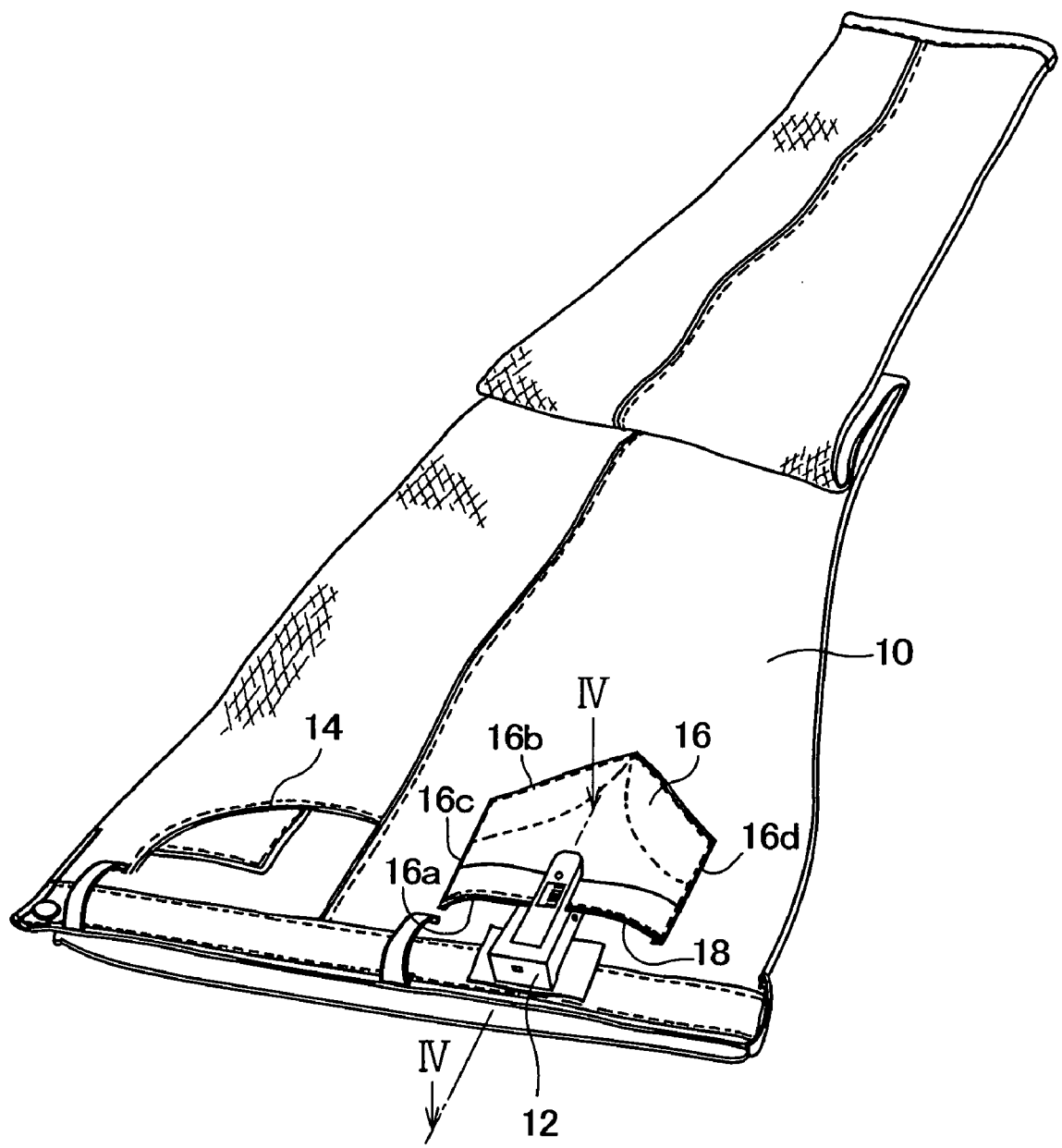
FIG. 1 is a perspective view of denim jeans and a reusable security tag holder made according to one embodiment of the present invention and clamped onto one of the rear pockets of the denim jeans.

Like reference numerals are used throughout the figures of the drawing to designate like or similar parts.

Referring first to FIG. 1, there is illustrated denim jeans 10 to which a clamp-on holder or reusable security tag holder 12 made according to one embodiment of the present invention is releasably attached. The jeans 10 have a pair of front pockets (only one is shown) 14 and a pair of rear pockets 16 (only one is shown). The rear pocket 16 is secured, as by stitching, to the hip portion of the jeans 10. The rear pocket 16 has a top edge 16a, a V-shaped bottom edge 16b, an inside edge 16c extending between one end of the top and bottom edges 16a, 16b, and an outside edge 16d extending between the other end of the top and bottom edges 16a, 16b. The rear pocket 16 has an opening 18 along its top edge 16a for accessing the interior of the rear pocket 16. Illustratively, the security tag holder 12 is clamped onto the top edge 16a of the rear pocket 16. The security tag holder 12 may alternatively be clamped onto the front pocket 14 or other parts of the jeans 10. It should be understood that the security tag holder 12 may be clamped onto shirts and other garments.

Figure 2:
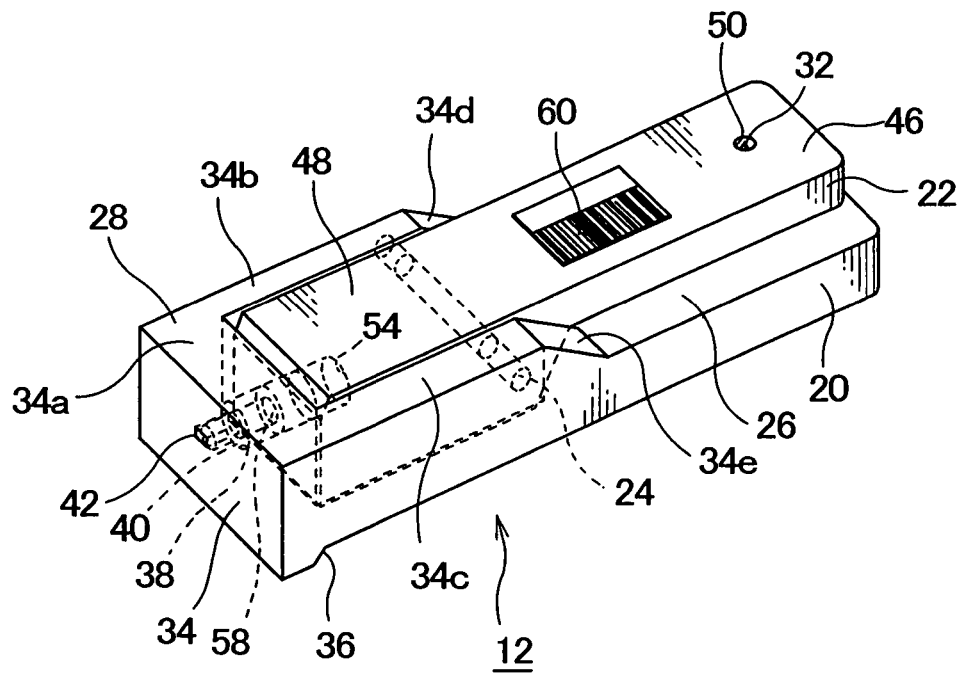
FIG. 2 is an enlarged perspective view of the security tag holder with first and second members held in their closed position.
Figure 3:
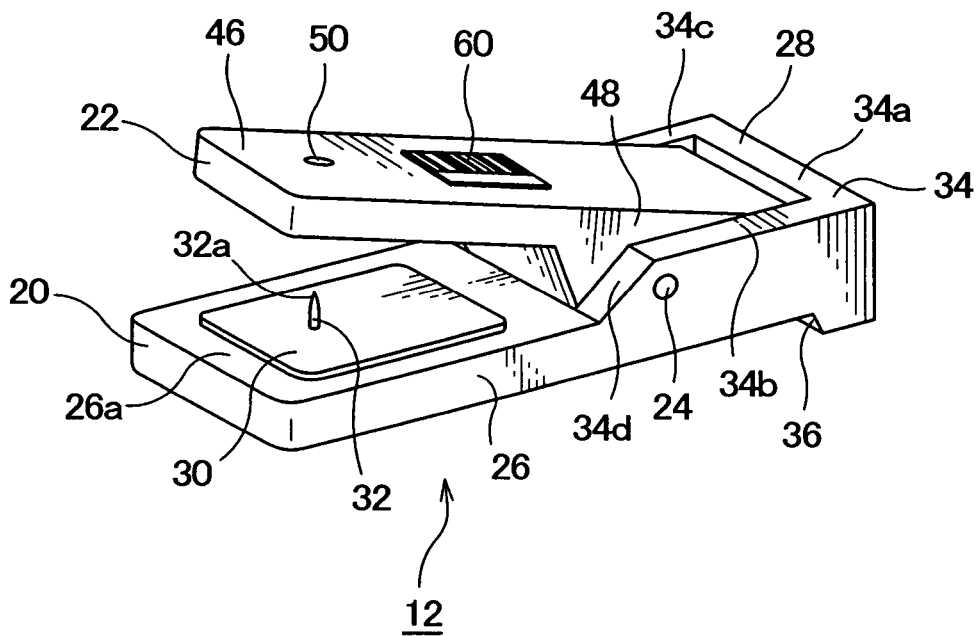
FIG. 3 is an enlarged perspective view of the security tag holder, as viewed in a direction opposite to that of FIG. 2, with the first and second members held in their open position.
Figure 4:
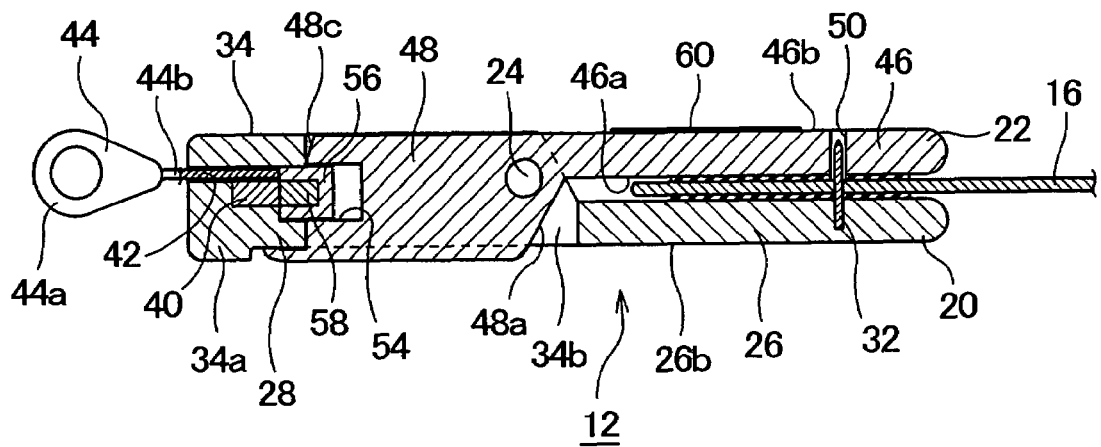
FIG. 4 is a longitudinal sectional view, on an enlarged scale, taken on the line IV-IV in FIG. 1.
Figure 5:
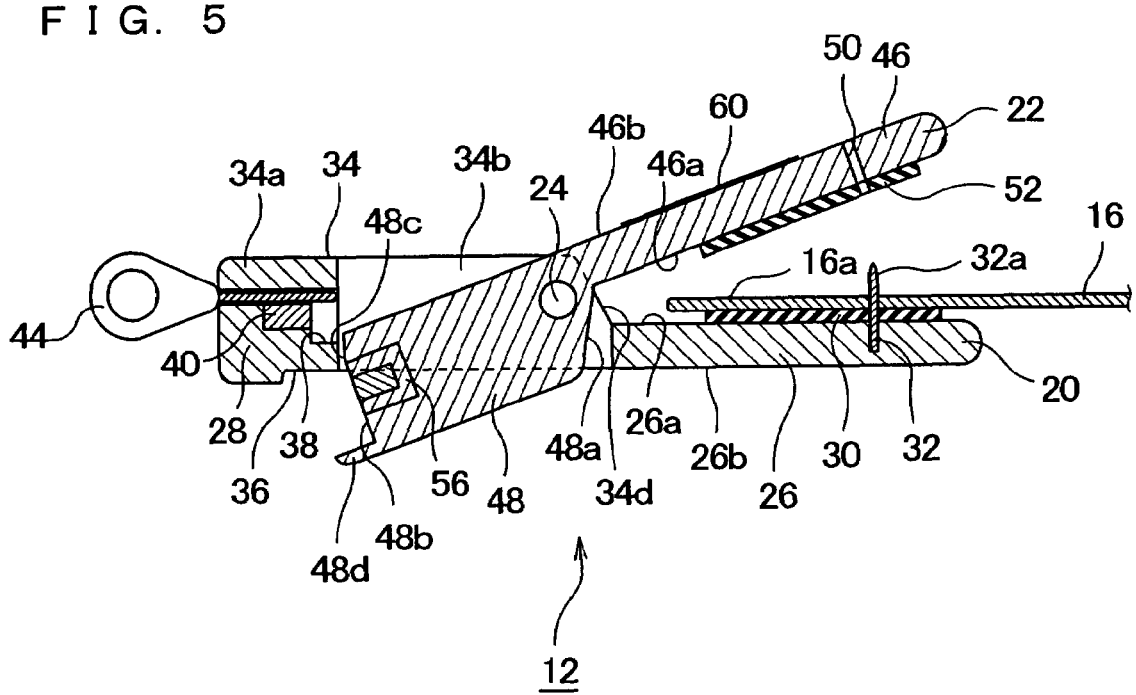
FIG. 5 is a view similar to that of FIG. 4, but showing that a key is inserted into a key hole to move the first and second members from their closed to open position.

Referring to FIGS. 2 to 5, the security tag holder 12 is made, for example, of plastic and includes a first member 20 and a second member 22 coupled to the first member 20 for relative pivotal movement about a common pivot pin 24. The first and second members 20, 22 are pivotably moved between an open position as shown in FIGS. 3 and 5 and a closed position as shown in FIGS. 1, 2 and 4.

More specifically, the first member 20 includes a generally rectangular first clamping region 26 at one side of the pivot pin 24 and a first locking region 28 at the other side of the pivot pin 24. The first clamping region 26 has an inner, mating surface 26a and an outer, non-mating surface 26b. A rectangular clamp pad 30 is attached, as by adhesive, to the mating surface 26a of the first clamping region 26. The clamp pad 30 serves as a slip resistant means for preventing the jeans 10 and the security tag holder 12 from being separated from each other after the rear pocket 16 is clamped between the first and second members 20, 22. The clamp pad 30 is preferably made of a non-skid material such as rubber. A pin 32 is secured to the first clamping region 26 and extends upwardly through the clamp pad 30. The pin 32 has a pointed end 32a. The first locking region 28 is in the form of a generally C-shaped frame 34 composed of an end wall 34a and opposite side walls 34b, 34c extending parallel to each other. The side walls 34b, 34c each have one end respectively connected to opposite ends of the end wall 34a and the other end connected to the first clamping region 26. The side walls 34b, 34c each have an inclined front surface 34d, 34e, respectively. The pivot pin 24 extends between the side walls 34b, 34c and is located adjacent to the inclined front surfaces 34d, 34e of the side walls 34b, 34c. The bottom of the end wall 34a extends outwardly from the bottom of the side walls 34b, 34c to form a step 36. A cylindrical recess 38 is defined in the front surface of the end wall 34a. A fixed permanent magnet 40 is embedded in the end wall 34a and has one end exposed to the recess 38. A key hole 42 is defined in the end wall 34a and extends between the bottom of the recess 38 and the rear surface of the end wall 34a. As shown in FIGS. 4 and 5, a key 44 includes an annular grip 44a and a pin 44b extending from the annular grip 44a. The pin 44b has a length slightly greater than the distance between the bottom of the recess 38 and the rear surface of the end wall 34a.

Similarly, the second member 22 includes a second clamping region 46 at one side of the pivot pin 24 and a second locking region 48 at the other side of the pivot pin 24. The second clamping region 46 has an inner, mating surface 46a and an outer, non-mating surface 46b. A through hole 50 is defined in the second clamping region 46 and sized to receive the pin 32. It should be understood that the hole 50 may not extend through the second clamping region 46 and may terminate short of the non-mating surface 46b of the second clamping region 46. Like the clamp pad 30, a clamp pad 52 is attached, as by adhesive, to the mating surface 46a of the second clamping region 46. The clamp pad 52 is preferably made of a non-skid material such as rubber. The second locking region 48 has a thickness greater than the thickness of the second clamping region 46. The second locking region 48 is surrounded by the end wall 34a and the side walls 34b, 34c of the first locking region 28 when the first and second members 20, 22 are moved to their closed position as shown better in FIG. 2. The second locking region 48 has an inclined front surface 48a and a vertical rear surface 48b. The rear surface 48b of the second locking region 48 has an upper, tapered end 48c and a lower, projected end 48d. The tapered end 48c of the rear surface 48b allows the first and second members 20, 22 to be smoothly pivoted relative to each other between their closed and open positions, as shown better in FIGS. 4 and 5. The projected end 48d of the rear surface 48b of the second locking region 48 is engaged with the lower surface of the first locking region 28 adjacent to the step 36 when the first and second members 20, 22 are relatively pivoted to their closed position, as shown better in FIG. 4. A cylindrical bore 54 is defined in the rear end of the second locking region 48. A cylindrical magnet case 56 is slidably inserted into the bore 54. The cylindrical magnet case 56 is substantially identical in diameter to the cylindrical recess 38. A movable permanent magnet 58 is firmly fitted in the magnet case 56. The fixed and movable magnets 40, 58 have opposite polarities. The movable magnet 58 together with the magnet case 56 is movable between an unlocking position wherein the movable magnet 58 is fully received in the bore 54 as shown in FIGS. 3 and 5 and a locking position wherein the movable magnet 58 is partly extracted from the bore 54, and the extracted part of the movable magnet 58 is inserted into the recess 38 and magnetically attracted to the fixed magnet 40 as shown in FIGS. 2 and 4. It should be understood that one of the fixed and movable magnets 40, 58 may be made of a ferromagnetic material.

A security tag 60 is attached onto the non-mating surface 46b of the second clamping region 46. The security tag 60 may take the form of a film antenna sensor emitter element integrally formed with a bar code label. The details of such an element forms no part of the present invention and therefore, will not be described herein. The security tag 60 is detectable when the security tag holder 12 is moved through a security gate (not shown). It should be understood that the security tag may take any other forms and may also be embedded in the first member 20 or the second member 22.

To attach the security tag holder 12 to the jeans 10, the first and second members 20, 22 are first held in their open position by hand, as shown in FIG. 3. The security tag holder 12 is then placed over the top edge 16a of the rear pocket 16, and the pin 32 is passed through the rear pocket 16 as shown better in FIG. 5. The first and second members 20, 22 are pivotally moved toward each other until the clamp pads 30, 52 are urged against each other to firmly grasp the top edge 16a of the rear pocket 16, as shown better in FIG. 4. At this time, the pin 32 is inserted into the through hole 50. When the first and second members 20, 22 are urged against each other, the bore 54 is brought into alignment with the recess 38. As a result, the movable magnet 58 together with the magnet case 56 is slidably extracted from the bore 54 and partly moved into the recess 38. The movable magnet 58 is then attracted to the fixed magnet 40. As shown better in FIG. 4, approximately one half of the magnet case 56 is located in the recess 38, and the other half of the magnet case 56 is located in the bore 54. The magnet case 56 thus positioned latchingly locks the first and second members 20, 22 against relative pivotal movement. In other words, the first and second members 20, 22 are locked automatically when they 20, 22 are moved to their closed position to clamp the rear pocket 16 between the first and second clamping regions 26, 46. This arrangement provides for easy operation of the security tag holder 12.

To release the security tag holder 12 from the jeans 10, the key 44 is inserted into the key hole 42 until the distal or free end of the pin 44b comes into contact with the movable magnet 58 as shown better in FIG. 4. Further insertion of the key 44 causes the movable magnet 58 to be separated from the fixed magnet 40 and fully retracted into the bore 54. This allows the first and second members 20, 22 to be pivotably moved back to their open position as shown better in FIG. 5.

Figure 6:
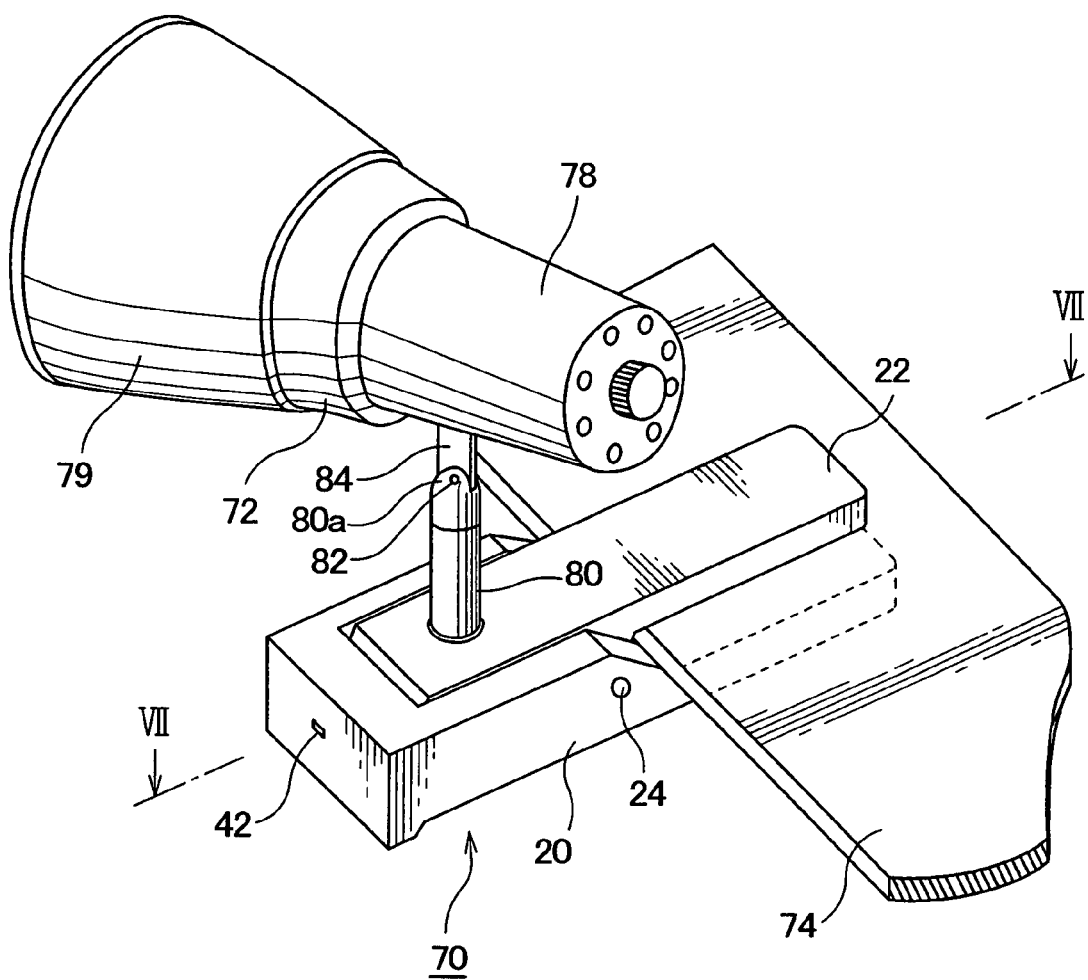
FIG. 6 is a perspective view of a lamp holder made according to another embodiment of the present invention and designed to hold a lamp.
Figure 7:
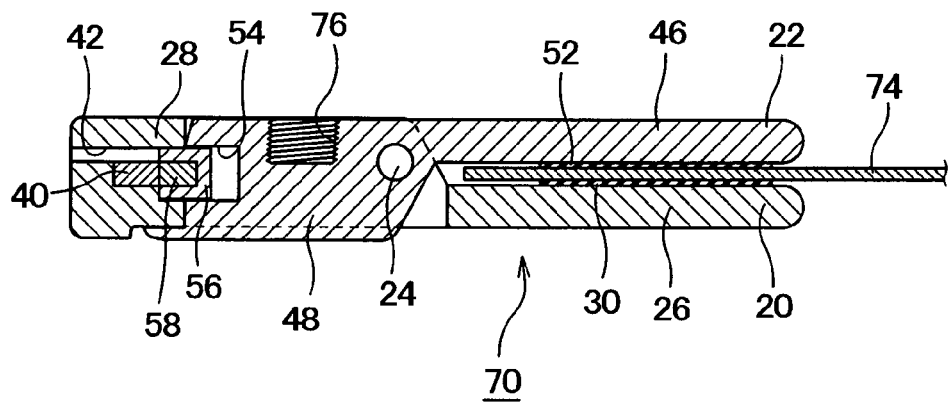
FIG. 7 is a longitudinal sectional view taken on the line VII-VII in FIG. 6.

Referring to FIG. 6, there is illustrated a lamp holder 70 as a clamp-on holder made according to another embodiment of the present invention and designed to hold a lamp 72. The first and second members 20, 22 are clamped on a top panel 74 of a desk. It should be understood that the lamp holder 70 may be clamped on any other support surfaces such as eaves of houses and buildings. In the embodiment shown in FIG. 6, the pin 32 and the hole 50 used in the embodiment shown in FIGS. 2 to 5 are omitted from the first and second members 20, 22, respectively. Instead, the second locking region 48 has a threaded hole 76 as shown in FIG. 7. The lamp 72 includes a cylindrical housing 78 and a lamp shade 79 connected to the housing 78 and shaped to cover a lamp bulb (not shown). A cylindrical lamp post 80 has an upper, bifurcated end 80a and a lower, threaded end (not shown). The bifurcated end 80a of the lamp post 80 has a pivot pin 82. The housing 78 has a bracket 84 connected to the pivot pin 82 so that the housing 78 and the lamp shade 79 can be rotated to a desired angle. The threaded end of the lamp post 80 is threaded into the threaded hole 76 of the second locking region 48 to secure the lamp 72 to the lamp holder 70.

To secure the lamp holder 70 to the top panel 74 of the desk, the first and second members 20, 22 are first held in their open position without the lamp 72. The first and second members 20, 22 are straddled over the top panel 74 of the desk and then, urged against each other to clamp the edge of the top panel 74 between the first and second clamping regions 26, 46. Simultaneously, the movable magnet 58 is attracted to the fixed magnet 40 to lock the first and second members 20, 22 against relative pivotal movement and thus, ensure the clamping condition. Thereafter, the threaded end of the lamp post 80 is threaded into the threaded hole 76 of the second locking region 48 to secure the lamp 72 to the lamp holder 70. The lamp holder 70 can be removed from the top panel 74 of the desk by inserting the key (not shown in FIGS. 6 and 7) into the key hole 42 and moving the movable magnet 58 back into the bore 54.

Figure 8:
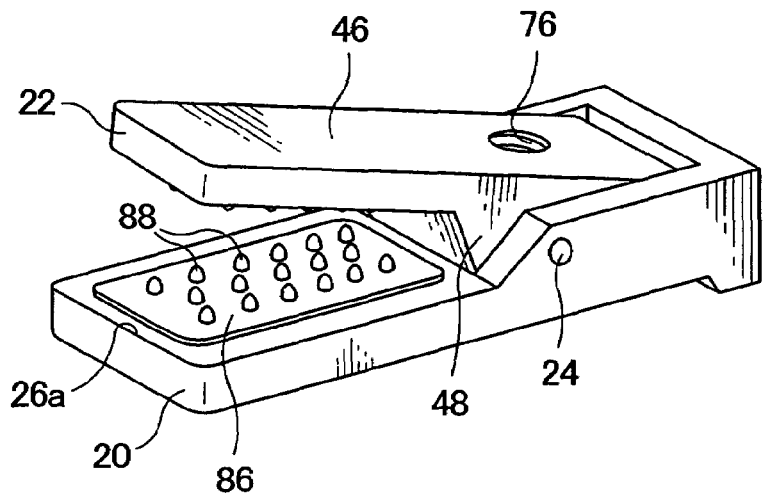
FIG. 8 is a perspective view of the lamp holder shown in FIG. 6, but with a modified form of clamp pads.
Figure 9:
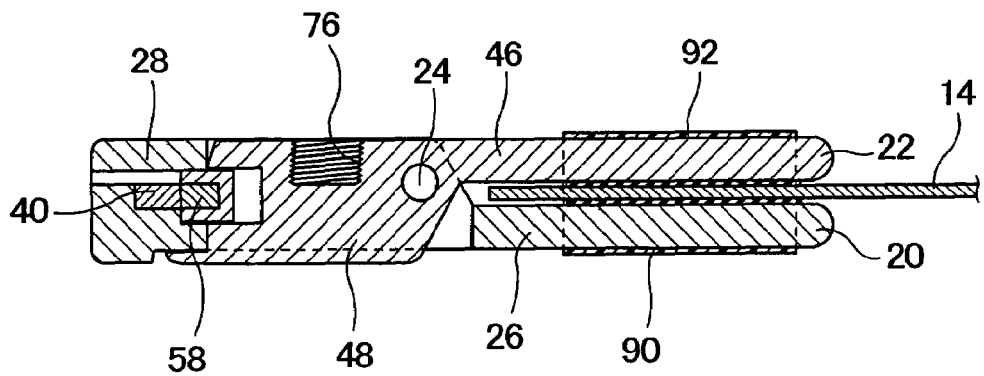
FIG. 9 is a view similar to that of FIG. 7, but showing that clamp pads are wound entirely around the first and second members, respectively.
Figure 10:
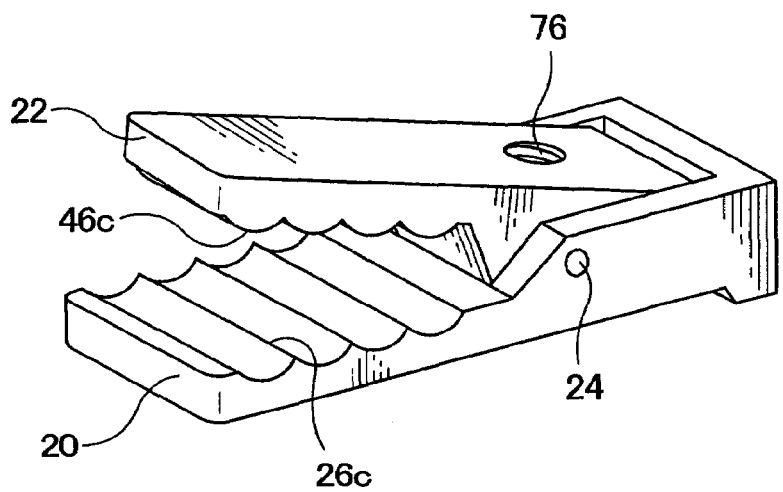
FIG. 10 is a view similar to that of FIG. 8, but showing that the first and second members include serrated surfaces.

FIG. 8 shows a modified form of the clamp pads 30, 52. Specifically, clamp pads 86 (only one is shown) may have a plurality of arrays of protrusions 88 thereon. As an alternative, clamp pads 90, 92 may be wound entirely around the first and second clamping regions 26, 46, respectively, as shown in FIG. 9. In lieu of the clamp pads, the first and second clamping regions 26, 46 may have serrated mating surfaces 26c, 46c, as shown in FIG. 10.

FIG. 11 illustrates a security camera holder 94 as a clamp-on holder made according to a further embodiment of the present invention and designed to hold a security camera 96. The security camera holder 94 is clamped on a round support structure or pipe 98. To this end, first and second clamping regions 26, 46 have semicircular recesses 26d, 46d which are aligned with each other when the first and second members 20, 22 are moved to their closed position. The security camera 96 is secured to the holder 94 in the same manner as the lamp 72 shown in FIG. 6. The other structure of this embodiment is substantially identical to that of the embodiment shown in FIG. 6 and therefore, will not be described herein. It should be understood that the recesses may take rectangular or any other shapes. Also, a plurality of recesses may be formed in the first and second clamping regions 26, 46.

Although the present invention has been described with respect to its preferred embodiments, it is to be understood that various modifications and changes may be made without departing from the scope of the invention as claimed.

What is claimed is:

1. A clamp-on holder comprising:

a first member; and a second member coupled to said first member for relative pivotal movement about a common pivot pin, said first member having a first clamping region at one side of said pivot pin and a first locking region at an other side of said pivot pin, said second member having a second clamping region at one side of said pivot pin and a second locking region at an other side of said pivot pin, said first locking region including a recess and a fixed magnetic element, said second locking region including a movable magnetic element and a bore dimensioned to accommodate said movable magnetic element, said movable magnetic element being movable between an unlocking position wherein said movable magnetic element is received in said bore and a locking position wherein said movable magnetic element is partly extracted from said bore, and said partly extracted portion of said movable magnetic element is inserted into said recess and magnetically attracted to said fixed magnetic element, said first and second members being relatively pivotable between an open position wherein said first and second clamping regions are separated from one another and a closed position wherein said first and second clamping regions are urged towards one another and adapted to clamp an external object therebetween, said movable magnetic element being moved from said unlocking position to said locking position to lock said first and second members against relative pivotal movement when said first and second members are pivotably moved from said open position to said closed position.

2. A clamp-on holder according to claim 1, wherein said first clamping region has a mating surface and an opposite non-mating surface, and said second clamping region has a mating surface and an opposite non-mating surface, at least one of said mating surface of said first clamping region and said mating surface of said second clamping region including slip resistant means for preventing removal of the external object from between said first and second clamping regions when said first and second members are interlocked together.

3. A clamp-on holder according to claim 2, wherein said slip resistant means includes clamp pads secured on said mating surface of said first clamping region and said mating surface of said second clamping region, respectively.

4. A clamp-on holder according to claim 3, wherein said clamp pads are made of rubber.

5. A clamp-on holder according to claim 4, wherein each of said clamp pads has a plurality of protrusions thereon.

6. A clamp-on holder according to claim 2, wherein said slip resistant means includes clamp pads extending around said first clamping region and said second clamping region, respectively.

7. A clamp-on holder according to claim 2, wherein said slip resistant means includes serrated surfaces formed on said mating surface of said first clamping region and said mating surface of said second clamping region, respectively.

8. A clamp-on holder according to claim 1, wherein one of said first clamping region and said second clamping region includes a pin, and the other clamping region includes a hole positioned and sized to receive said pin when the first and second members are moved to said closed position.

9. A clamp-on holder according to claim 1, wherein one of said first and second members includes a security tag.

10. A clamp-on holder according to claim 1, wherein said first locking region includes an end wall and opposite side walls having one end connected to opposite ends of said end wall, respectively and an other end connected to said first clamping region, and said second locking region is surrounded by said end wall and said side walls when said first and second members are held in said closed position.

11. A clamp-on holder according to claim 10, wherein said pivot pin extends between said side walls.

12. A clamp-on holder according to claim 1, wherein said first locking region includes a key hole for providing access to said recess.

13. A clamp-on holder according to claim 12, further comprising a key insertable into said key hole and configured to move said movable magnetic element from said locking position to said unlocking position.

14. A clamp-on holder according to claim 1, wherein one of said first and second members includes a threaded hole.

15. A clamp-on holder according to claim 1, wherein said first clamping region includes at least one recess, and said second clamping region includes at least one recess aligned with said at least one recess of said first clamping region when said first and second members are moved to said closed position.

16. A clamp-on holder according to claim 15, wherein said at least one recess of said first clamping region has a semicircular section, and said at least one recess of said second clamping region has a semicircular section.

17. A security tag holder comprising:
a first member having one end and an other end;
a second member having one end and an other end, said first and second members being pivotable relative to each other; and
a security tag held by one of said first and second members, said first member having a first clamping region at said one end thereof and a first locking region at said other end of said first member,
said second member having a second clamping region at said one end thereof and a second locking region at said other end of said second member,
said first locking region of said first member including a recess and a fixed magnetic element,
said second locking region of said second member including a movable magnetic element and a bore dimensioned to accommodate said movable magnetic element, said movable magnetic element being movable between an unlocking position wherein said movable magnetic element is received in said bore and a locking position wherein a first part of said movable magnetic element is located in said bore, and a second part of said movable magnetic element is located in said recess,
said first and second members being relatively pivotable between an open position wherein said first and second clamping regions are separated from one another and a closed position wherein said first and second clamping regions are urged towards one another,
said movable magnetic element being moved from said unlocking position to said locking position to lock said first and second members against relative pivotal movement when said first and second members are pivotably moved from said open position to said closed position.

18. A security tag holder according to claim 17, wherein one of said first and second clamping regions includes a pin, and the other clamping region includes a hole positioned and sized to receive said pin when the first and second member are moved to said closed position.

19. A security tag holder according to claim 17, wherein said first locking region of said first member includes a key hole for providing access to said recess.

20. A security tag holder according to claim 17, wherein said first clamping region of said first member has a mating surface and an opposite non-mating surface, and said second clamping region of said second member has a mating surface and an opposite non-mating surface, at least one of said mating surface of said first clamping region and said mating surface of said second clamping region including slip resistant means.

* * * * *

UNITED STATES PATENT AND TRADEMARK OFFICE
CERTIFICATE OF CORRECTION

PATENT NO. : 7,441,424 B2
APPLICATION NO. : 11/799735
DATED : October 28, 2008
INVENTOR(S) : Saitoh et al.

Page 1 of 2

It is certified that error appears in the above-identified patent and that said Letters Patent is hereby corrected as shown below:

Title page:
　　After "*Primary Examiner*" change "Lloyd A Gall" to --Lloyd A. Gall--.

Column 1:
　　Line 6, change "holders and more" to --holders and, more--.
　　Line 55, after "unlocking position" insert a comma.
　　Line 56, after "in the bore" insert a comma.
　　Line 57, after "locking position" insert a comma.
　　Line 62, after "open position" insert a comma.
　　Line 63, after "one another" insert a comma.
　　Line 64, change "position wherein" to --position, wherein--.
　　Line 65, after "one another" insert a comma.
　　Line 66, change "object such as a garment therebetween." to --object, such as a garment, therebetween.--.

Column 3:
　　Line 25, after "tag holder 12" insert a comma.
　　Line 26, after "present invention" insert a comma.
　　Line 28, change "pockets (only one is shown) 14" to --pockets 14 (only one is shown)--.
　　Lines 47-48, change "open position as shown in FIGS. 3 and 5 and a closed position as shown in FIGS. 1, 2 and 4." to --open position, as shown in FIGS. 3 and 5, and a closed position, as shown in FIGS. 1, 2, and 4--.
　　Line 56, change "slip resistant" to --slip-resistant--.

Column 4:
　　Line 53, after "magnet 58" insert a comma; after "magnet case 56" insert a comma.
　　Line 54, after "unlocking position" insert a comma.
　　Line 55, after "3 and 5" insert a comma.
　　Line 56, after "locking position" insert a comma.
　　Line 67, change "invention and therefore," to --invention and, therefore,--.

UNITED STATES PATENT AND TRADEMARK OFFICE
CERTIFICATE OF CORRECTION

PATENT NO. : 7,441,424 B2
APPLICATION NO. : 11/799735
DATED : October 28, 2008
INVENTOR(S) : Saitoh et al.

It is certified that error appears in the above-identified patent and that said Letters Patent is hereby corrected as shown below:

Column 6:
    Line 1, change "movement and thus, ensure" to --movement, and thus ensure--.
    Line 28, change "and therefore, will not" to --and, therefore, will not--.
    Line 52, after "unlocking position" insert a comma.
    Line 54, change "said bore and a locking position wherein" to --said bore, and a locking position, wherein--.
    Line 60, after "open position" insert a comma.
    Line 61, after "one another" insert a comma.
    Line 62, after "closed position" insert a comma.

Column 7:
    Line 9, line 13, line 22, and line 26, change "slip resistant" to --slip-resistant--.
    Line 39, change "wall, respectively and" to --wall, respectively, and--.

Column 8:
    Line 26, after "unlocking position" insert a comma.
    Line 27, change "said bore and a locking position" to --said bore, and a locking position,--.
    Line 44, change "member are" to --members are--.
    Line 55, change "slip resis-" to --slip-resis- --.

Signed and Sealed this

Seventh Day of April, 2009

JOHN DOLL
*Acting Director of the United States Patent and Trademark Office*